United States Patent [19]

Kodama

[11] Patent Number: 5,266,297
[45] Date of Patent: Nov. 30, 1993

[54] LIQUID OXIDIZING METHOD AND APPARATUS

[75] Inventor: Shigemi Kodama, Tokyo, Japan

[73] Assignee: Sugita Wire Mfg. Co., Ltd., Tokyo, Japan

[21] Appl. No.: 970,591

[22] Filed: Oct. 29, 1992

Related U.S. Application Data

[60] Continuation of Ser. No. 727,677, Jul. 10, 1991, abandoned, which is a division of Ser. No. 466,834, Jan. 18, 1990, abandoned.

[30] Foreign Application Priority Data

Jan. 20, 1989 [JP] Japan .................. 2-11162

[51] Int. Cl.⁵ .................. C01G 49/14; C01G 49/02
[52] U.S. Cl. .................. 423/548; 423/143; 423/144; 423/549; 423/558; 423/DIG. 1; 423/DIG. 2; 210/758
[58] Field of Search .................. 210/758; 423/548, 549, 423/558, DIG. 1, 143, 144, DIG. 2

[56] References Cited

U.S. PATENT DOCUMENTS

| | | |
|---|---|---|
| 2,128,311 | 8/1938 | Mertes . |
| 2,213,907 | 9/1940 | Fleckenstein et al. . |
| 3,947,560 | 3/1976 | Nambu et al. ............ 423/522 |
| 4,234,560 | 11/1980 | Kuerten et al. . |

FOREIGN PATENT DOCUMENTS

| | | |
|---|---|---|
| 2129564 | 12/1972 | Fed. Rep. of Germany . |
| 2436124 | 2/1976 | Fed. Rep. of Germany . |
| 2317231 | 2/1977 | France . |
| 49-53195 | 5/1974 | Japan . |
| 53-23266 | 7/1978 | Japan . |
| 327938 | 11/1972 | U.S.S.R. . |
| 661058 | 11/1951 | United Kingdom . |
| 1486759 | 9/1977 | United Kingdom . |

OTHER PUBLICATIONS

Perry, *Chemical Engineers Handbook,* 4th Ed., McGraw Hill Book Co., 1963, pp. 21-13.
Chemical Abstracts, vol. 90, No. 12, Mar. 19, 1979, p. 110, Abstract No. 89451b.
Chemical Abstracts, vol. 107, No. 8, Aug. 24, 1987, p. 142, Abstract No. 61510r.
Chemical Abstracts, vol. 95, No. 14, Oct. 5, 1981, p. 135, Abstract No. 117818a.
Comprehensive Dictionary of Engineering and Technology, vol. IX by Dr.-Ing. Richard Ernst (1966).
The New Collins Dictionary and Thesaurus in One Volume (1986).
Chemical Engineers' Handbook (Fifth Edition) (1973).

*Primary Examiner*—Michael Lewis
*Assistant Examiner*—Stephen G. Kalinchak
*Attorney, Agent, or Firm*—Nikaido, Marmelstein, Murray & Oram

[57] ABSTRACT

A liquid oxidizing system has a closed circuit in which a liquid containing matter to be oxidized is circulated. The circuit is provided with an ejector for forming a jet stream of the liquid into which oxygen, or both oxygen and an oxidizing catalyst are supplied. The oxygen (and the catalyst) rapidly contacts the matter to be oxidized in the jet stream and oxidizes it. The system is not only applicable to the treatment of waste water, such as from factories, but also useful for making a product by oxidizing a liquid, e.g. iron polysulfate which is a good coagulant.

7 Claims, 4 Drawing Sheets

LIQUID OXIDIZING METHOD AND APPARATUS

This application is a continuation of application Ser. No. 727,677 filed Jul. 10, 1991 now abandoned; which is a division of application Ser. No. 466,834 filed Jan. 18, 1990 now abandoned.

BACKGROUND OF THE INVENTION

1. Field of the Invention

This invention relates to the oxidation of a liquid, and more particularly, to a method and an apparatus for oxidizing a liquid containing the matter to be oxidized, such as ferrous or sulfurous ions, in the presence or absence of an oxidizing catalyst.

2. Description of the Prior Art

There are a variety of systems which are used for the oxidizing treatment of a liquid containing the matter to be oxidized. They include a system of the type which is used for oxidizing sludge, industrial waste water, a liquid which has absorbed sulfur as a result of the desulfurization of smoke, or the like, and a system of the type which is used for producing a particular treating agent by oxidation.

The former type of system is used for oxidizing, for example, a liquid which has absorbed sulfurous ions as a result of the desulfurization of smoke, or waste water from a factory containing dissolved ferrous ions. It has, however, a number of disadvantages, particularly if the liquid to be treated has a low pH value. The treatment of the liquid requires a long time of reaction by employing a large amount of oxidizing agent in a large apparatus. It sometimes calls for the application of heat. Therefore, it is expensive and yet has a low reaction efficiency.

The latter type of system is used for manufacturing, for example, iron polysulfate which has recently drawn much attention as a coagulant. According to the disclosure of Japanese Patent Application laid open under No. 53195/1974, an acid solution containing ferrous sulfate which occurs as a by-product when waste sulfuric acid is recovered from, for example, the process for pickling iron and steel is oxidized with an oxidizing agent, such as air or oxygen, in the presence of an oxidizing catalyst, such as nitrogen oxide, to produce a basic inorganic high molecular iron polysulfate containing an OH group between ferric sulfate and $SO_4^{-2}$. Likewise, Japanese Patent Publication No. 23266/1978 discloses the manufacture of a basic coagulant comprising a double salt formed from iron polychloride and iron sulfate. In either event, however, the liquid to be oxidized has so low a pH value that its oxidation requires a large amount of oxidizing agent, and it has been difficult to manufacture iron polysulfate at a low cost and with a high efficiency.

SUMMARY OF THE INVENTION

Under these circumstances, it is an object of this invention to provide a system which can oxidize a liquid containing the matter to be oxidized with a high efficiency and at a low cost.

According to the conventional oxidizing systems of the nature to which this invention pertains, it has been usual practice to put the liquid to be treated in a reaction vessel equipped with a stirrer and introduce an oxidizing agent, such as air or oxygen, and an oxidizing catalyst into the liquid, while stirring it. The stirrer, however, has a limited stirring speed and can only stir the liquid and the oxidizing agent comparatively slowly in the whole reaction vessel. Therefore, the matter to be oxidized and the oxidizing agent do not contact each other effectively, but undergo only a slow oxidizing reaction. Moreover, as the oxidizing agent is simply supplied into the reaction vessel, it is necessary to supply an uneconomically large amount of oxidizing agent.

Under the circumstances, I, the inventor of this invention, have devoted myself to a search for a means for permitting the liquid to be treated and the oxidizing agent to contact each other faster than they can when merely stirred by a stirrer, and also for enabling an efficient oxidizing reaction if the minimum amount of oxidizing agent is supplied to the area where it contacts the liquid. As a result, I have thought of providing a liquid circulating circuit with an ejector to achieve a rapid oxidizing reaction. I have found that the ejector forms a jet stream of the liquid to be treated into which oxygen, or both oxygen and an oxidizing catalyst are drawn to thereby realize a more rapid and efficient oxidizing reaction.

However, even the system including an ejector has a low reaction efficiency due to the escape of the oxidizing agent, and the infiltration of any gas that is undesirable for an oxidizing reaction, if a reaction vessel not closed, but defining an open oxidizing circuit is used as in the conventional system. Therefore, I have decided to construct a closed oxidizing circuit, as well as using oxygen as the oxidizing agent.

Thus, this invention essentially provides an oxidizing system forming a closed circuit in which a liquid containing the matter to be oxidized is circulated, and which is provided with an ejector for forming a jet stream of the liquid into which oxygen (and an oxidizing catalyst) is supplied, so that the oxygen (and the catalyst) may be mixed and contacted rapidly with the matter to be oxidized and oxidize it efficiently.

DETAILED DESCRIPTION OF THE INVENTION

Figure 1:
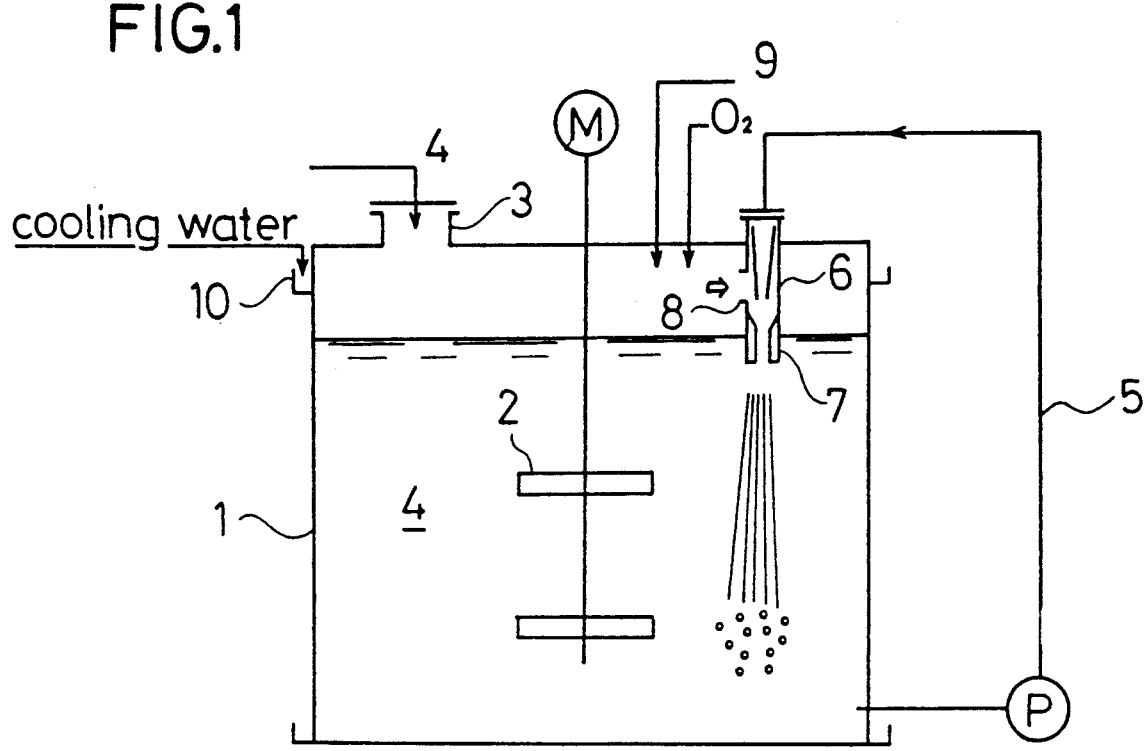
FIG. 1 is a schematic sectional view of the oxidizing apparatus as used in EXAMPLE 1 which will hereinafter be described.

Description will be made of the oxidizing system of this invention with reference to FIG. 1. FIG. 1 shows an oxidizing apparatus comprising a reaction vessel of the closed construction containing a stirrer 2 driven by a motor M. The vessel 1 has a liquid supply port 3 through which the liquid 4 to be treated can be introduced into the vessel 1. A bypass 5 is connected to the vessel 1 and is provided with a pump P for circulating the liquid. The vessel 1 and the bypass 5 form a closed circuit. The closed circuit is provided with an ejector 6 at the top of the vessel 1 or in the bypass 5.

The ejector 6 comprises a nozzle 7, and an inlet through which an oxidizing agent (e.g. oxygen, $O_2$) is supplied into the nozzle 7. The nozzle 7 forms a rapid jet stream of the liquid to be treated, and the oxidizing agent entering the inlet 8 is supplied into the jet stream. This enables the efficient mixing of oxygen (and an oxidizing catalyst) with the matter to be oxidized which the liquid contains, and thereby an efficient oxidizing reaction, as well as a reduction in the amount of the oxidizing agent which is required.

The catalyst 9 may be mixed in the oxidizing agent which is supplied adjacent to the ejector 6 through its inlet 8. The supply of the catalyst with the oxidizing agent into the jet stream in the ejector 6 enables a still more efficient oxidizing reaction, as well as a reduction in the amount of the catalyst which is required.

If the ejector 6 is provided at the top of the vessel 1 as shown in FIG. 1, the vessel 1 has a vacant space above the liquid 4. The oxidizing agent is stored in the vacant space and is smoothly drawn into the ejector 6 through the inlet 8 by a negative pressure created by the jet stream formed in the ejector 6. The ejector 6 has a lower end which is usually so positioned as to be dipped in the liquid, though it may alternatively be located in the space above the liquid.

If the ejector 6 is provided in the bypass 5, it is necessary to provide at least an ejector portion in the vicinity of the inlet 8 with a vacant space into which the oxidizing agent can be supplied. The vacant space in the ejector 6 may be connected with the vacant space in the vessel 1.

Although the apparatus of FIG. 1 has only one ejector, it is also possible to provide two or more ejectors. Although FIG. 1 shows a batch system having a single closed oxidizing circuit, it is also possible to construct a continuous system having a plurality of closed circuits connected to one another.

The liquid supply port 3 is of the closable construction. The vessel 1 has also a port through which the oxidizing agent (and the catalyst) is supplied into the vessel 1, and a port through which the liquid which has been treated is discharged from the vessel 1. All of these ports are of the closable construction.

The catalyst may be appropriately selected to suit the matter to be oxidized.

BEST MODE OF CARRYING OUT THE INVENTION

The invention will now be described more specifically with reference to a number of examples. It is, however, to be understood that this invention is not limited to these examples, but is applicable to various other systems for oxidizing treatment.

EXAMPLE 1

This example was directed to the manufacture of iron polysulfate as a coagulant by employing the apparatus as shown in FIG. 1.

An appropriate amount of a mixture of ferrous sulfate ($FeSO_4 \cdot 7H_2O$), waste sulfuric acid ($H_2SO_4$) and water ($H_2O$) was supplied into the reaction vessel as the liquid to be treated. The sulfuric acid was employed in an amount giving a molar ratio of $SO_4^{-2}/Fe^{+2}$ which was larger than 1.0, but smaller than 1.5. The vacant space in the closed vessel was purged with oxygen. The pump was started to circulate the liquid through the bypass, so that the ejector might form a continuous jet stream of the liquid. Oxygen was supplied in the amount equal to one-third of the equivalent of $Fe^{+2}$, while at the same time, sodium nitrite, $NaNO_2$, was supplied at a rate of 0.8 kg/m$^3$ per hour as an oxidizing catalyst.

Figure 4:
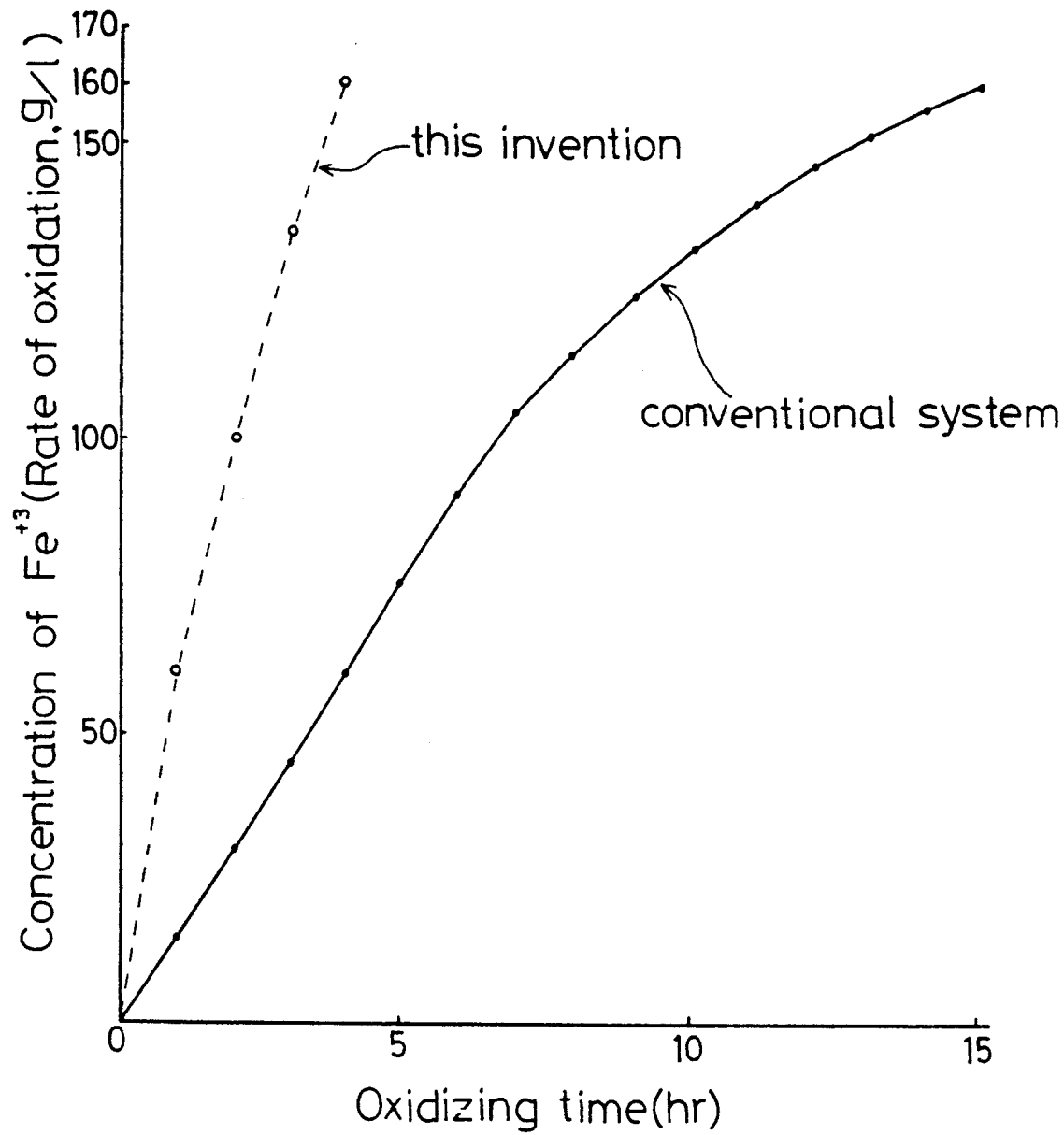
FIG. 4 is a graph showing the efficiency of iron polysulfate production (or the rate of oxidation) as achieved in EXAMPLE 1.
Figure 5:
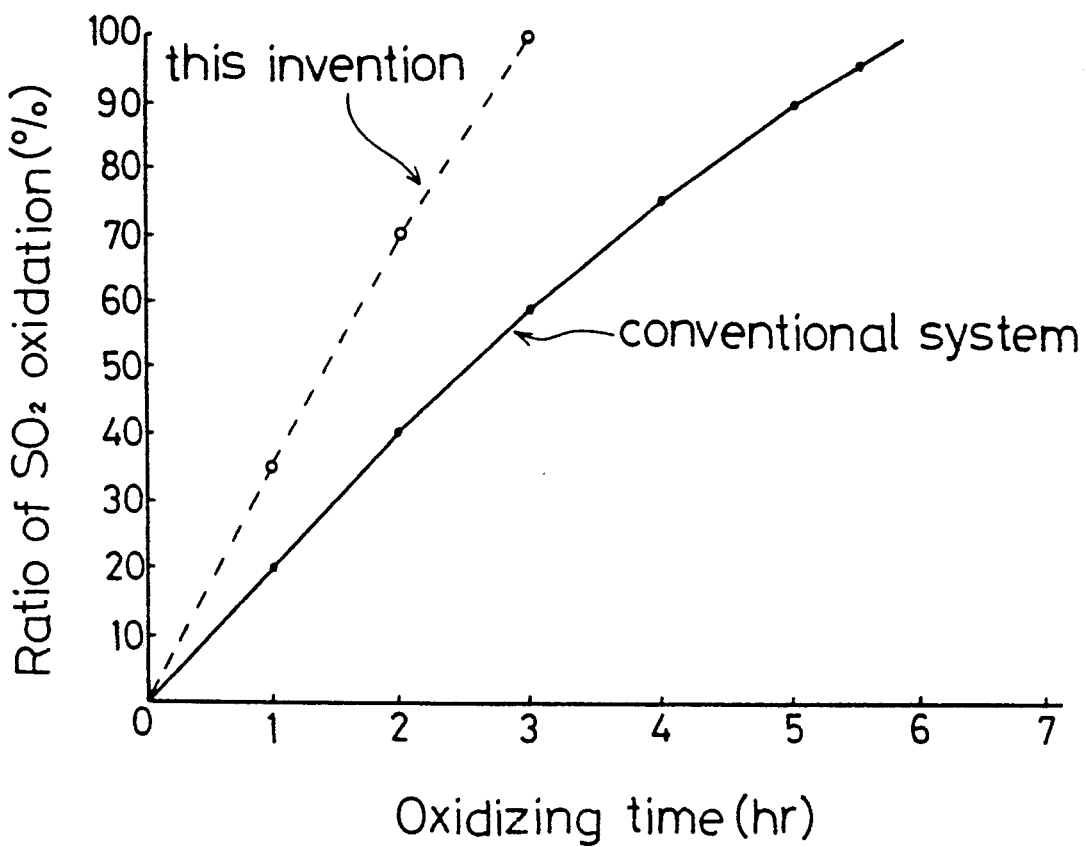
FIG. 5 is a graph showing the ratio of oxidation as obtained in EXAMPLE 1 from the treatment of a liquid resulting from the desulfurization of smoke.

As a result, the ferrous sulfate in the liquid flowing down the ejector was oxidized to form viscous iron polysulfate below the ejector. The oxidizing reaction which took place showed an efficiency which was about four times higher than what could be achieved in the production of iron polysulfate by the conventional system, as is obvious from FIG. 4.

Iron polysulfate is expressed by the formula $[Fe_2(OH)_n \cdot (SO_4)_{3-n/2}]_m$, where n is larger than 2, and $m = f(n)$. It is a substance in the form of a solution of a kind of high molecular basic complex salt of ferric sulfate. It contains a large amount of polymeric iron complex ions, such as $[Fe(H_2O)_6]^{-3}$, $[Fe_2(OH)_3]^{-3}$ or $[Fe(OH)_2]^{-3}$, and has a high level of flocculating or coagulating property.

It is economical to use NO, $NO_2$ or other nitrogen oxide as the catalyst.

EXAMPLE 2

The procedures of EXAMPLE 1 were followed for treating a liquid resulting from the desulfurization of smoke. The system of this invention showed a ratio of oxidation which was about twice higher than what could be obtained by the conventional system.

EXAMPLE 3

Figure 2:
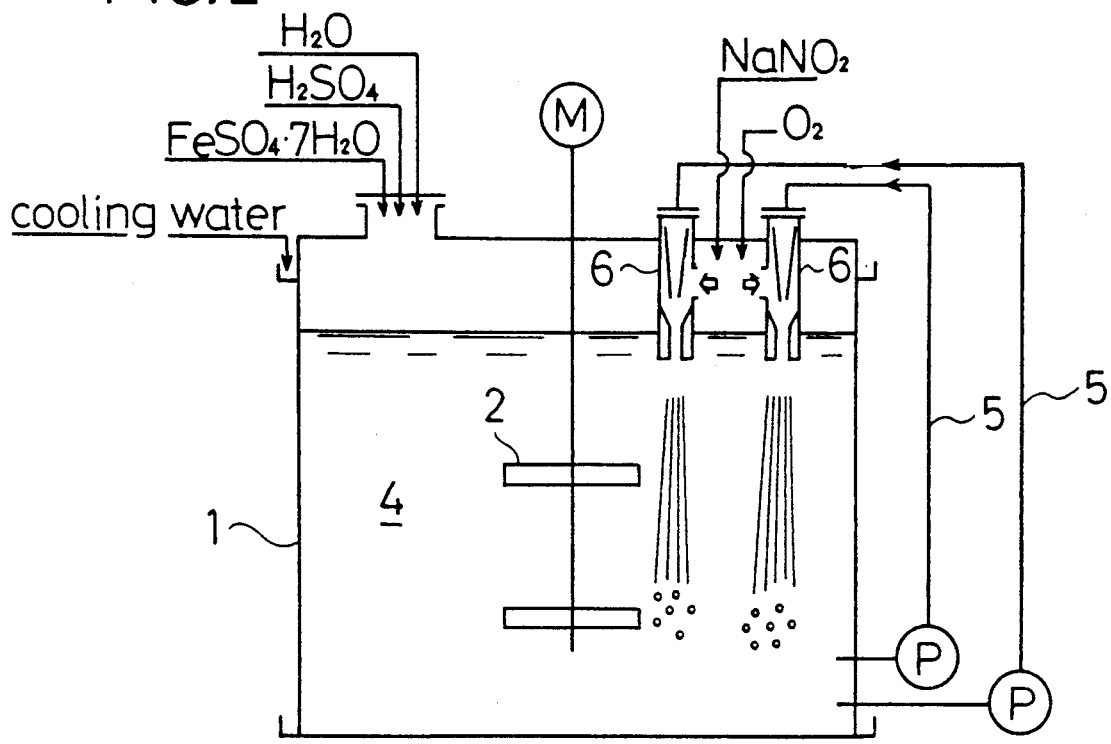
FIG. 2 is a schematic sectional view of the oxidizing apparatus as used in EXAMPLE 3.

The procedures of EXAMPLE 1 were followed for producing iron polysulfate, except that the apparatus was modified as shown in FIG. 2. The modified apparatus had two bypasses 5 connected to the reaction vessel and each having an outlet opening toward the vacant space in the to one of the bypasses 5.

The modified system showed a reaction efficiency which was about twice higher than what had been obtained in EXAMPLE 1.

EXAMPLE 4

Figure 3:
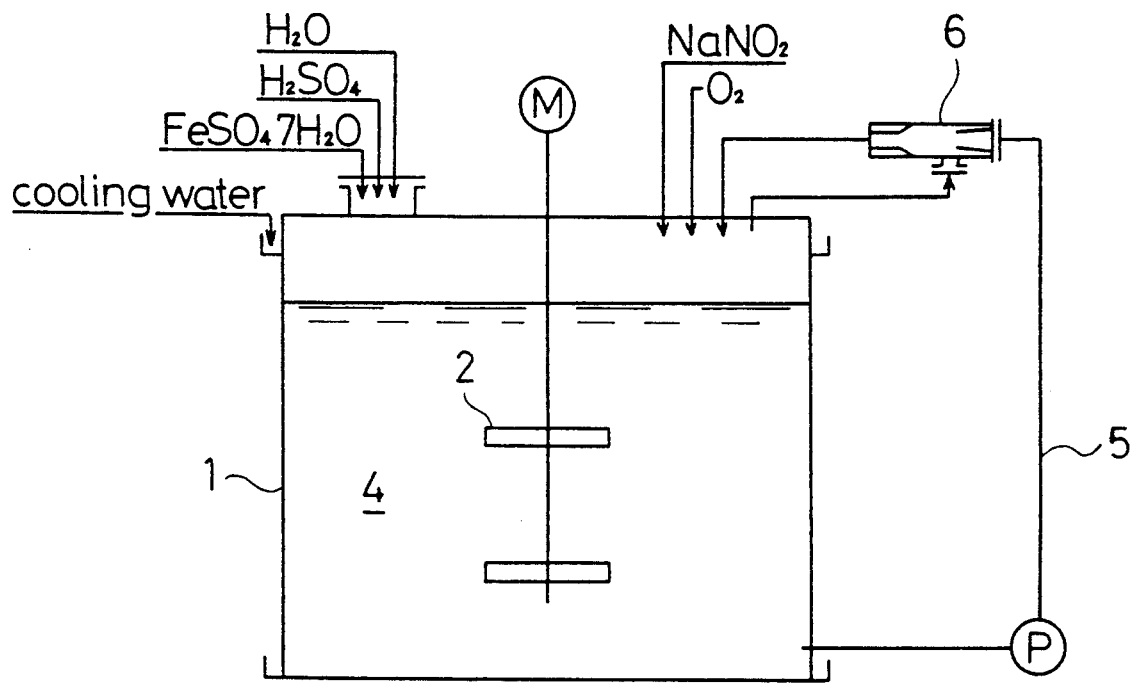
FIG. 3 is a schematic sectional view of the oxidizing apparatus as used in EXAMPLE 4.

The procedures of EXAMPLE 1 were followed for producing iron polysulfate, except that the apparatus was modified as shown in FIG. 3, i.e. the ejector 6 was provided in the bypass 5 outside the reaction vessel 1. The modified system showed a reaction efficiency which was comparable to what had been obtained in EXAMPLE 1.

Although the invention has been described with reference to the examples directed to the manufacture of iron polysulfate, it is easy to produce a double salt of iron polychloride and iron sulfate, too, if the liquid to be treated further contains a solution of iron chloride.

INDUSTRIAL APPLICABILITY

This invention makes it possible to accomplish an efficient and economical oxidizing treatment of a liquid by employing a compact system defining a closed circuit provided with an ejector for forming a jet stream of the liquid into which an oxidizing agent is supplied to cause an oxidizing reaction, as hereinabove described. Therefore, the invention is not only useful for the treatment of waste water, such as from factories, but also applicable to a system for making a particular product at a low cost by oxidizing a liquid.

I claim:

1. A method of oxidizing a liquid, containing matter to be oxidized, in closed circuit apparatus comprising: a closed reaction vessel; a reservoir of liquid contained in said vessel defining a gas space in said vessel above said liquid; means to stir said liquid in said reservoir; pump means to circulate said liquid from said reservoir through an outer bypass conduit, through said space and back to said reservoir; and ejector means in a portion of said circulation means which is in open communication with said space sufficient to draw material, including gas, from said space into said circulation means;

said method comprising: purging said reservoir and said circulation means with said liquid; providing oxygen in said space in an amount at least sufficient to oxidize said matter; circulating liquid thorugh said ejector means at a velocity sufficient to form a jet stream of said liquid; providing oxidation catalyst comprising sodium nitrite into said space at a location immediately adjacent to said ejector means; causing said oxygen and said oxidation catalyst to flow from said gas space into said ejector means and thence into said circulation means forming a mixture of said oxygen and said oxidation catalyst with said liquid in said jet stream under conditions at which said liquid is oxidized; thereby oxidizing said oxidizable matter; feeding said jet stream of said mixture to said reservoir, thereby stirring said reservoir with said stirring means and with said jet stream an amount sufficient to accelerate the oxidation of said oxidizable matter; and circulating a mixture of said liquid, oxidation catalyst and oxygen through said circulation means.

2. The method as claimed in claim 1 wherein said liquid is selected from the group consisting of: a mixture of ferrous sulfate, waste sulfuric acid and water; a mixture of ferrous sulfate, waste sulfuric acid, iron chloride and water; and a liquid containing sulfur as a result of the desulfurization of smoke.

3. The method as claimed in claim 1 wherein said oxidation catalyst is in solid form.

4. The method as claimed in claim 1 wherein sodium nitrite is supplied as a powder.

5. The method as claimed in claim 1 wherein sodium nitrite is supplied as an aqueous solution.

6. The method as claimed in claim 1 including introducing said oxidation catalyst into said space substantially continuously.

7. In the method of oxidizing matter to be oxidized contained in a liquid, in closed circuit apparatus comprising:

a closed reaction vessel;
a reservoir of liquid, containing matter to be oxidized therein, contained in said vessel;
a gas space in said vessel above said liquid;
means to introduce an oxygen containing gas, and an oxidation catalyst, into effective contact with said matter to be oxidized in said liquid;
mechanical means to stir said liquid in said reservoir;
outer bypass conduit means in effective contact with said reservoir adapted to draw liquid from said reservoir and return such to said reservoir; and
pump means in effective contact with said outer bypass conduit means adapted to circulate liquid from said reservoir through said outer bypass conduit means and back to said reservoir;

said method comprising:

purging said reservoir and said outer bypass conduit means with said liquid;
providing an oxygen containing gas in said space in an amount at least sufficient to oxidize said matter; and
bringing said oxygen containing gas and said oxidation catalyst into effective contact with said liquid in an amount sufficient to oxidize matter to be oxidized contained in said liquid;

the improvement which comprises:

providing ejector means in said outer bypass conduit means in said gas space;
providing sodium nitrite oxidation catalyst in said gas space immediately adjacent to said ejector means;
moving liquid through said outer bypass conduit at a velocity sufficient to form a jet pump effect in said ejector means;
drawing oxygen containing gas and sodium nitrite from said space into and through said ejector means by means of said jet pump effect;
causing oxygen, sodium nitrite, and liquid circulating through said outer bypass conduit means to be under conditions at which oxidizable components in said liquid are oxidized;
oxidizing said oxidizable component of said liquid in said outer bypass conduit means;
feeding the contents of said outer bypass conduit means, immediately downstream of said ejector means, into said reservoir;
thereby stirring said reservoir, by the action of said mechanical stirring means and by the action of said contents of said outer bypass conduit means, an amount sufficient to accelerate the oxidation of oxidizable matter contained in the liquid in said reservoir; and
circulating a mixture of said liquid, sodium nitrite and oxygen through said outer bypass conduit means to said ejector means.

* * * * *